June 22, 1937.  E. A. STALKER  2,084,464
AIRCRAFT
Filed Oct. 28, 1935   6 Sheets-Sheet 1

INVENTOR
Edward A. Stalker

June 22, 1937. E. A. STALKER 2,084,464
AIRCRAFT
Filed Oct. 28, 1935 6 Sheets-Sheet 2
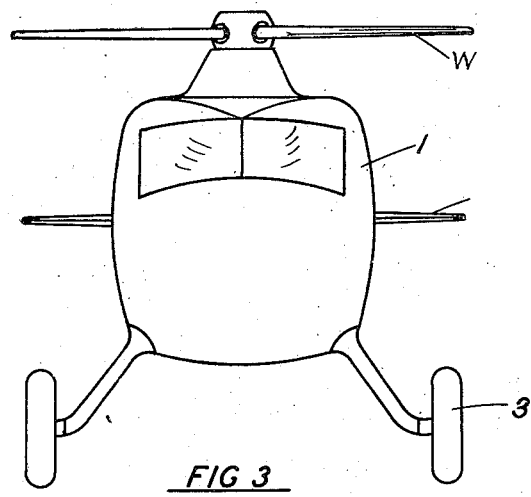
FIG 3
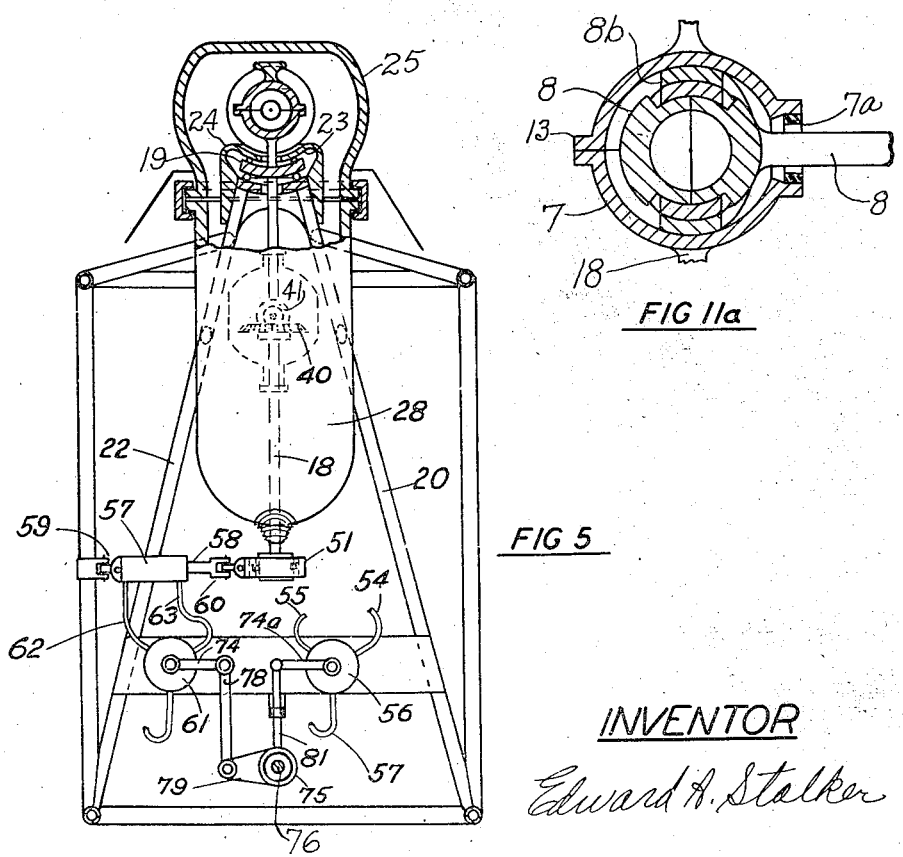
FIG 11a
FIG 5
INVENTOR
Edward A. Stalker

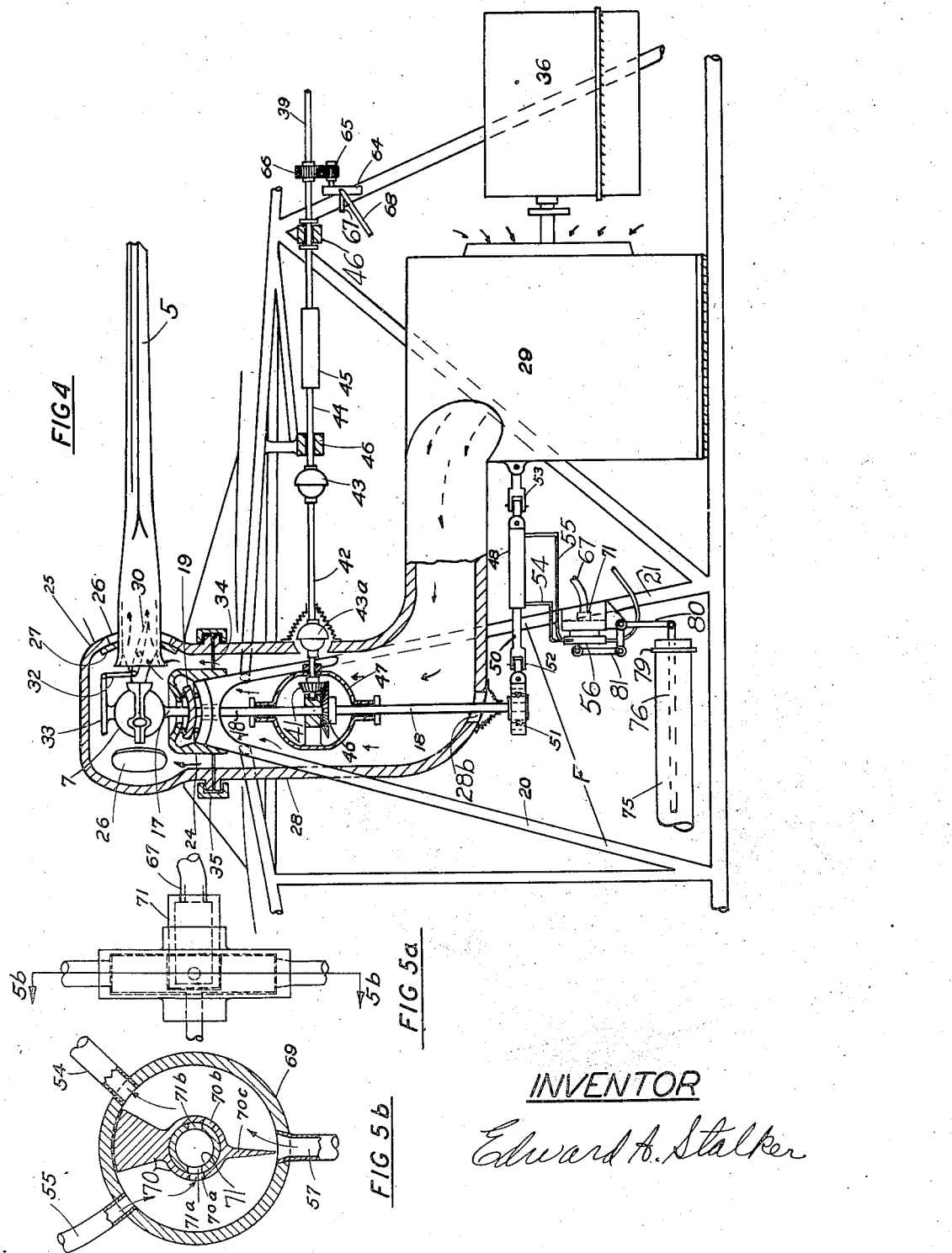

June 22, 1937. E. A. STALKER 2,084,464
AIRCRAFT
Filed Oct. 28, 1935 6 Sheets-Sheet 4
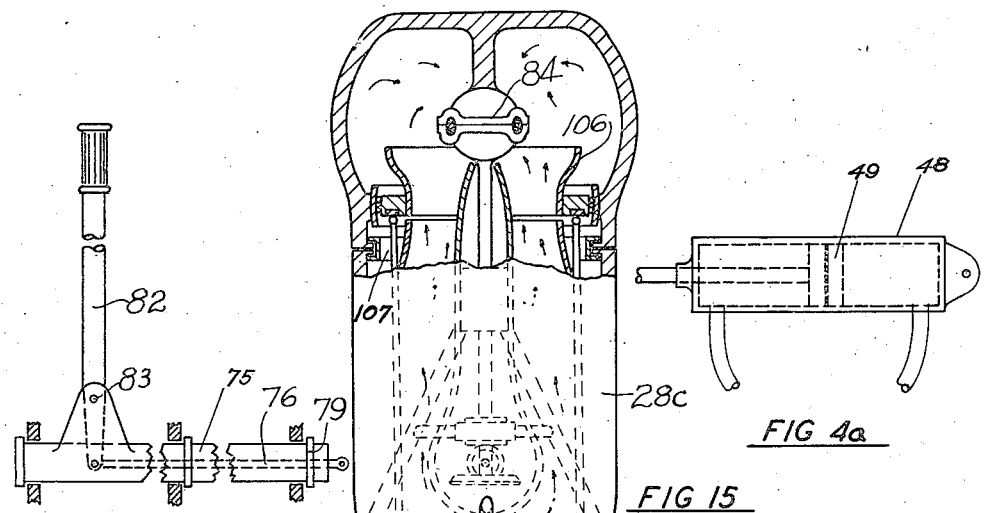
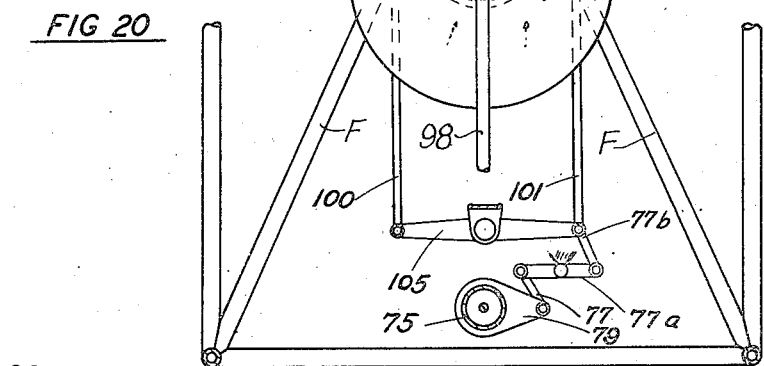
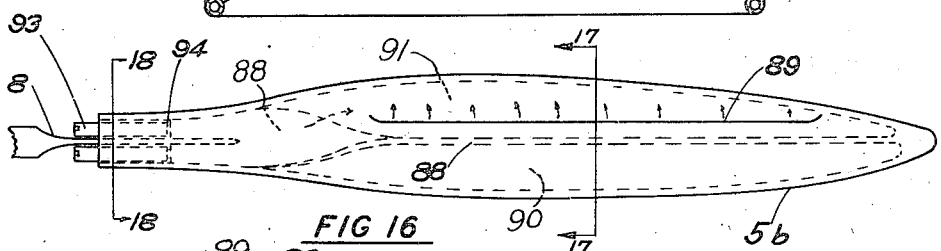
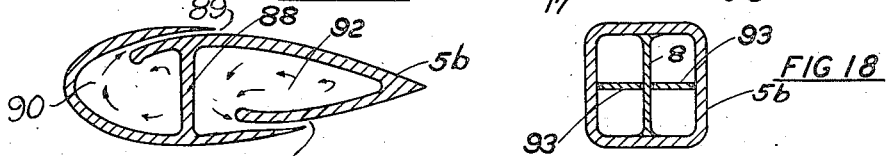
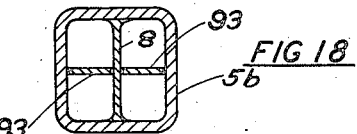
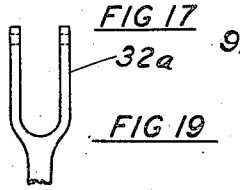
INVENTOR
Edward A. Stalker June 22, 1937.  E. A. STALKER  2,084,464
AIRCRAFT
Filed Oct. 28, 1935   6 Sheets-Sheet 5

INVENTOR
Edward A. Stalker

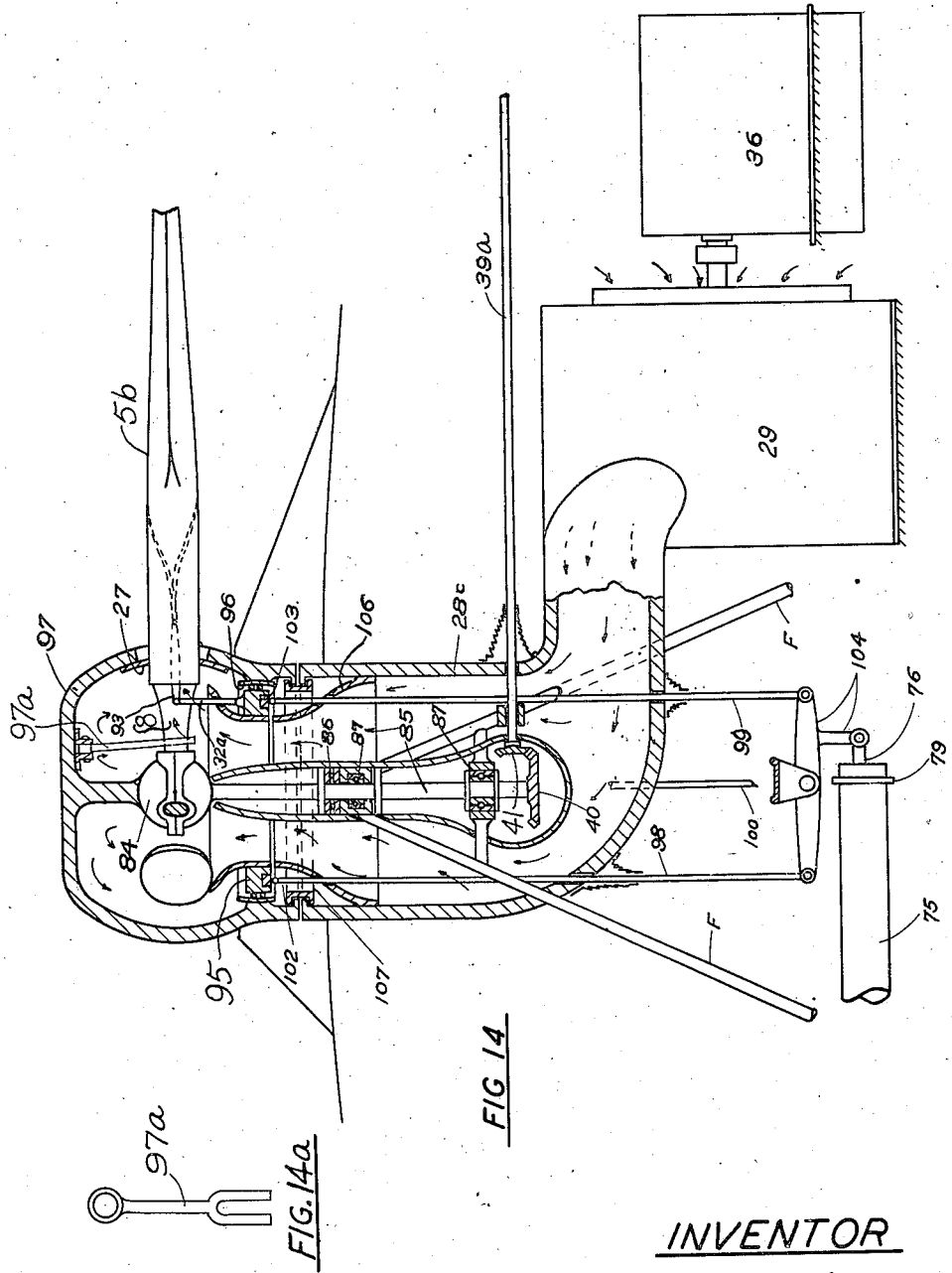

Patented June 22, 1937

2,084,464

UNITED STATES PATENT OFFICE 2,084,464

AIRCRAFT

Edward A. Stalker, Ann Arbor, Mich.

Application October 28, 1935, Serial No. 47,131

6 Claims. (Cl. 244—17)

My invention relates to aircraft, particularly rotary wing aircraft, and it has for its objects; first, to provide boundary layer means of suppressing the lateral dissymmetry in lift arising from differences in relative air velocities; second, to provide means of lateral and longitudinal control by tilting the axis of rotation of the wing system; third, to provide directional control deriving power from the autorotation of the wing system; fourth, to provide an aircraft which is controllable about any axis under any condition of flight, is free from lift and gyroscopic unbalance and has power means to rotate the wings.

I have filed previous applications which have subject matter in common with this application, namely, Serial No. 695,149 filed October 25, 1933, Serial No. 699,885 filed November 27, 1933, and Serial No. 29,476 filed July 2, 1935 respectively.

I accomplish these objects by the devices illustrated in the accompanying drawings in which—

Figure 3 is a front elevation of the aircraft;

Figure 4 is a fragmentary part section of the aircraft along the line 4—4 in Figure 2;

Figure 4a illustrates the cylinder and piston used in the control system;

Figure 5 is a fragmentary part section along the line 5—5 in Figure 2;

Figure 5a is a side elevation of the valve used in the control system;

Figure 5b is a section of the valve along the line 5b—5b in Figure 5a;

Figure 11a is a part section of the hub along line 11a—11a in Figure 11;

Figure 14 illustrates the preferred form of the wing and related structure and is a fragmentary part section along line 14—14 in Figure 2;

Figure 14a illustrates the forked arm used to control the angle of attack of the wings;

Figure 15 is a fragmentary part section in elevation of the preferred form taken along line 15—15 in Figure 2;

Figure 16 is a fragmentary top plan view of a wing;

Figure 17 is a vertical chordwise section taken along line 17—17 in Figure 16;

Figure 18 is a vertical section along line 18—18 in Figure 16;

Figure 19 is a fragmentary elevation of a valve fork;

Figure 20 is a side elevation of a portion of the control mechanism isolated from the aircraft.

Figure 1:
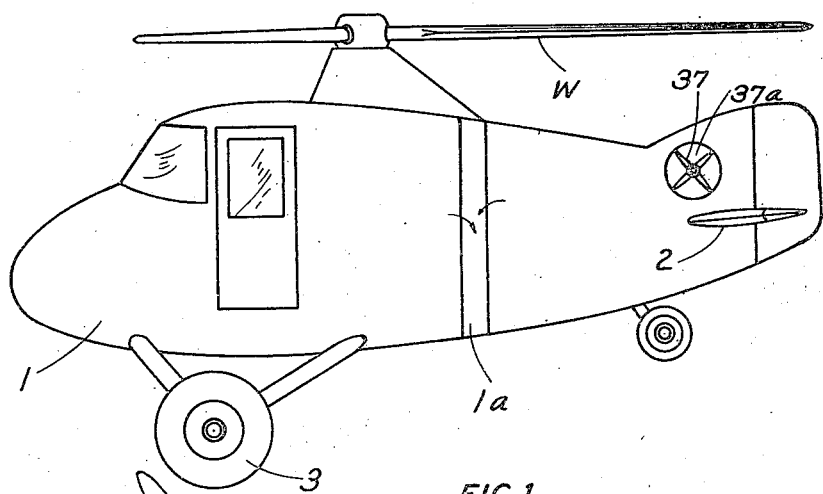
Figure 1 is a side elevation of the aircraft.

When fluid flows past a body there is a layer of fluid adjacent the surface which is retarded by friction with the surface so that the velocity value is less than a value which would prevail were the fluid inviscid. This layer is called the boundary layer and is relatively thin. On curved bodies such as wings there is a low pressure region near the nose of the body which tends to pull back on the fluid stream. If the momentum of the stream is not destroyed this low pressure region does not entail any undesirable effects. But in the boundary layer the fluid has lost momentum and it is possible for the fluid of the layer to reverse its direction and move upstream with resulting turbulence and separation of the main stream from the wing surface. The lift decreases and the drag increases under these conditions.

If energy is added to the boundary layer it will not reverse its direction of flow and the high drag can be avoided. One means of adding energy to the layer is to form a slot in the body surface to emit fluid rearward substantially tangentially to the surface. The slot is in communication with the body interior and a means of blowing is employed to supply the fluid jet.

Besides energizing the boundary layer and increasing the lift the jet can also increase the lift by increasing the circulation about the wing section. It is well known in the science of aerodynamics that the lift can be explained as the resultant of two components of flow about the wing cross section. These components are the rectilinear flow due to the advance of the wing, and the circulation. The latter is defined as the integral of the velocity along any closed curve enclosing the wing and the differential of length of the curve. Blowing out a slot increases the circulation velocity and if the jet is directed rearward on top of the wing an increase in lift results. If the jet is directed rearward on the lower surface a negative circulation is induced and the lift decreases. I use both an upper and a lower surface slot to control the lift on the wings and thereby suppress dissymmetry of lift and provide steering control.

The wings system is comprised of wings pivoted for oscillation in the plane of rotation and normal thereto. Since the wings are free of structural restraint stopping their vertical oscillation relative to the body of the aircraft, no gyroscopic forces can be transmitted to the body.

In the absence of such a restraint control is secured by tilting the paths of rotation of the wings so that the resultant air force on the aircraft passes to one side of the center of gravity. This is also equivalent to tilting the axis of rotation of the wing system.

Tilting of the shaft upon which the wings are supported has been used before but in the former instances each blade was hinged to a hub so that there was an appreciable distance between the hinge axis and the axis of rotation of the wing system, that is, the shaft axis. This was always true for at least one of the hinge axes, either that for vertical or horizontal oscillation and usually for both. The offset of the hinge axis from the axis of rotation causes roughness in the operation of the wing system which is unpleasant to the passengers and dangerous to the structure.

The offset of the hinge for vertical oscillation served one useful purpose, however. When the shaft or axis of the wing system was tilted the wings shifted their paths of rotation automatically. This effect will be clear from the following illustration. Let there be no lift on the wings so that they are perpendicular to a shaft and its axis of rotation and hinged with an offset of the hinge axis from the axis of rotation. If the axis is tilted the elements of the blade are not at their maximum position from the axis and hence move outward until the blade is again perpendicular to the axis. Now consider the case where the wings are attached to the shaft by a ball and socket joint so that they are free to move in any angular direction. Let the wings be rotating and tilt the shaft. The wings will not change their paths of rotation since there is no means of changing the axis of rotation. The wings are free on the ball. In this case, if the paths of wings are to be changed the lift on the wings should be changed to move the wings. I do this through controlling a jet flow through slots in the wing.

Figure 2:
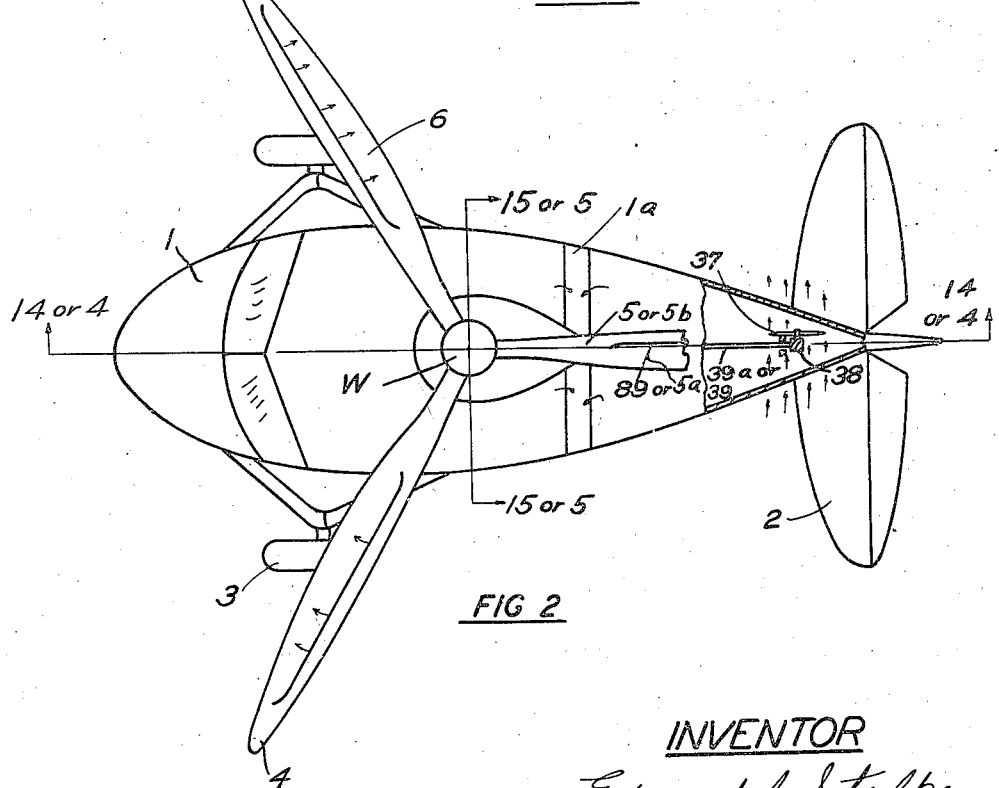
Figure 2 is a top plan view of the aircraft partly in section.

Referring particularly to Figures 1 to 3 the wing system is W, the fuselage is 1, the horizontal tail is 2, and the landing gear is 3.

Figure 6:
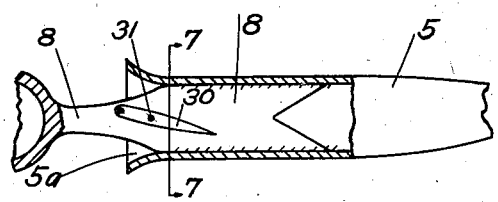
Figure 6 is a fragmentary vertical part section of the wing portion near the hub.
Figure 7:
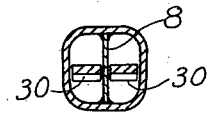
Figure 7 is a vertical section along the line 7—7 in Figure 6.
Figure 9:
Figure 9 is a cross section of the adjuster along line 9—9 of Figure 8.
Figure 10:
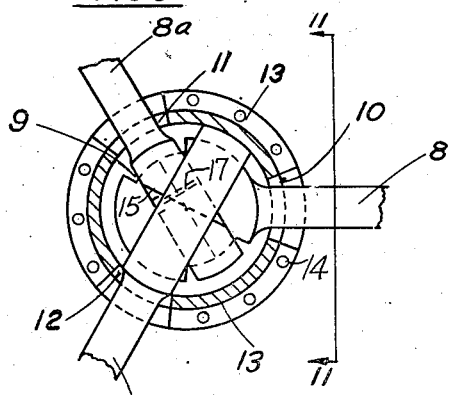
Figure 10 is a fragmentary part section of the hub along the line 10—10 in Figure 11.
Figure 11:
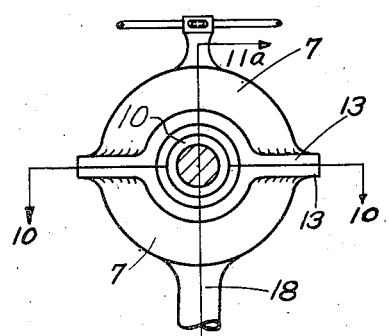
Figure 11 is a fragmentary side elevation of the hub.
Figure 12:
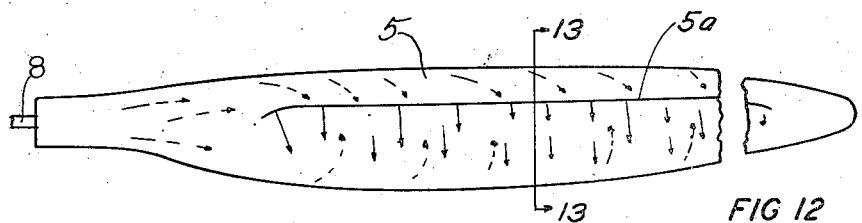
Figure 12 is a top plan view of a wing without the hub element.
Figure 13:
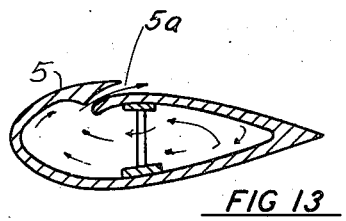
Figure 13 is a vertical chordwise section along the line 13—13 of Figure 12.

The wing system W supports the aircraft and is composed of the three wings 4, 5 and 6. The wings are supported in the hub socket 7 (see Figures 4 to 11) so that they have a common center of oscillation. The manner in which this support is accomplished is best illustrated in Figures 6, 10 and 11. Each wing has a hub element 8 fixed in the wing. Two of these elements have a ring shaped inner end while the third has a spherical end recessed to accommodate one of the rings. The conjunction of the ends of the hub elements is shown in Figure 10. The element 8 has the recessed spherical end. The element 8a is borne on the recessed portion 9 of element 8. The element 8b is borne on the element 8. These hub elements all have free limited motion relative to each other since all the bearing surfaces are spherical in form and the elements have running clearances. It will now be clear that all the wings to which the hub elements 8, 8a, 8b attach are free to oscillate about a common center in both vertical and horizontal planes, a rubber block 7a—Figure 11a—is inserted in the hub socket 7 about each hub element 8 to absorb the shock of limiting the oscillation of the wings.

The angular oscillations of the hub elements are limited by the apertures 10, 11 and 12 in the hub socket 7. This socket is formed in two halves having flanges 13. Bolts (not shown) through the flange holes 14 serve to fix the two halves together. The ring end of hub element 8b bears on the inner surface of the hub socket. Again, since all surfaces concerned are spherical, there is freedom for relative universal motion between the parts.

As shown in Figure 10, the ring of element 8a is split diagonally along line 15 so that it can be assembled over the end of element 8. A number of studs with recessed heads serve to hold the two parts of the element together. One of these bolts 17 is shown in Figure 10.

The hub socket 7 is supported through the hub shaft 18 which is integral at its upper end with the hub socket. Rigidly fixed to shaft 18 is the bearing plate 19 supported on the aircraft by the tripod frame F composed of upright members 20, 21 and 22. (See Figures 4 and 5.) The bearing plate is supported by the balls 23 for universal rocking and for rotation about the axis of shaft 18. A removable jacket 24 restrains the bearing plate against upward thrust. That is, the jacket 24 transmits the lift of the airscrew to the aircraft by virtue of its attachment to the tripod frame F. The studs or bolts attaching the jacket to the frame are not shown.

Enclosing the hub socket and the inner ends of the wings is the casing head 25 which has as many openings 26 as there are wings. The casing head is in part spherical, namely, at the inner surface about the openings 26. Thus any oscillation of the wings about the center of the hub socket is such that a sealing plate 27 can be kept in contact with the inner surface of the casing head.

In normal operation under power air is blown up the conduit 28 by the blower 29 into the casing head 25 from whence the air enters the wings W, for instance, wing 5 in Figure 4. The sealing plate 27 prevents fluid from escaping out the holes 26. The air enters the inner end of the wing and proceeds through the hollow interior to the slot 5a which is rearward directed, that is, directed to discharge the air toward the trailing edge of the wing. (See Figures 6, 7, 12 and 13, particularly.)

The fluid jet discharged from the slot will decrease the lift by energizing the boundary layer and if the jet flow is properly controlled the vertical oscillation of the wings can be suppressed. A pair of valves 30, Figures 4, 6 and 7, control the flow to the wing interiors. These valves are airfoil shaped preferably and are positioned on each side of the vertical end of element 8. The valves are pivoted for oscillation about the axis of the horizontal pivot 31. A forked link 32, Figure 4, connects the forward end of each valve 30 to an arm 33 rigidly fixed to the hub socket 7. It will now be clear that a vertical movement of the wing will cause an oscillation of the valves 30. Since the distance between the front edge of the valve and the pivot 31 is a small fraction of the distance between the center of oscillation for the wing and the front edge of the valve the angular change in the valve is very large in comparison to the angular change in the wing. Hence there can be a great change in the flow out of slot 5a in the wing for a small vertical oscillation of the wing.

The valves 30 and their linkages are arranged so that an upward swing of the wing will admit more air to the wing interior and the slot 5a so that the lift is decreased. A downward swing of the wing will reduce the air flow and give a higher lift to the wing. The theory of this has been previously discussed. Since each wing is equipped with valves 30 and the proper linkages 32 each wing independently controls the flow to its surface slot.

The casing head 25 is free to rotate relative to the conduit 28 by virtue of the joint at 34. The ring 35 which is made in two parts holds the casing head on the conduit 28.

The wings drive the socket 7 and the shaft 18 when the blower ceases to send air into the wing interiors, as for instance, if the engine 36 failed to function. The autorotation property of helicopter wings is well known.

I provide for directional control by means of a propeller 37, Figures 1 and 2, positioned in an opening 37a in the tail of the aircraft, and I make its rotation dependent on the rotation of the wings so that I have directional control even when the engine fails. I also provide means to operate the directional control in conjunction with the roll and pitching control.

The propeller 37 is actuated by the helical gears 38 of which one is on the shaft 39. This shaft 39 is driven by the wings through the shaft 18, bevel gears 40 and 41, shaft 42, universal joints 43 and 43a, shaft 44, and extension joint 45.

Figure 8:
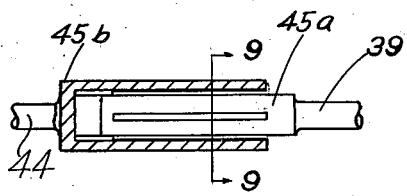
Figure 8 is a fragmentary part section of the shaft length adjuster.

Since the propeller 37 is positioned at a definite locality on the aircraft and since shaft 18 is oscillatable universally, the driving mechanism between shaft 18 and the propeller 37 must be accommodated to the movements of the shaft 18. The shaft 39 is supported in suitable bearings such as 46 and has no longitudinal movement, only rotary movement. When the shaft 18 is pushed forward or rearward the movement is accommodated by the expansion joint 45 which is also shown in Figures 8 and 9. It consists of a splined plunger 45a on the end of shaft 39 and a grooved cylinder 45b on the end of shaft 44. The splines and grooves permit axial sliding of the two parts and provide means to transmit rotary motion. Angular accommodation is secured through the universal joints 43 and 43a. This is a well known element and its details need not be given.

The alignment of the bevel gears 40 and 41 is secured by the housing 47 which is free to rotate on the shaft 18 and carries the bearing for the shaft 42. The opening 28a in the conduit is large enough to permit a sufficient annular swing of the shaft 42. The opening is sealed by a fabric bellows to prevent fluid leakage.

It will now be clear that the wings operating in an autorotative state can rotate the propeller 37. The propeller 37 is adjustable for pitch through positive and negative values, so that a force can be provided in either direction. I do not describe the pitch changing device since this is well known and is now procurable on the market. The control of the pitch can be placed near the pilot and preferably should be connected to the rudder pedals.

The rolling and pitching of the aircraft is accomplished through the oscillation of shaft 18.

If, for instance, this shaft is pushed forward at the lower end the valve 30 will be rotated relative to the wings which tend to maintain their normal path of rotation. The valves are moved because the hub socket 7 moves with the shaft 18 and the arm 33 and link 32 depress the forward edges of the valves of the wing extending rearward. The valves of the forward extending wings are moved in the opposite direction. It will be apparent that a downward movement of the valves of the rearward wing will admit more air to the lower surface slot and decrease the lift of the wing. On the other hand, less air will be admitted to the forward extending wing and so these wings will drop. In other words the mean path of rotation of the wings will be inclined downward in front; or the axis of rotation of the wings will be inclined forward at the top.

If the aircraft was in balance before the movement of the shaft 18, the line of action of the lifting force went through the center of gravity of the machine. If now the rotation axis of the wings is tilted forward at the top the lift force will pass to the rear of the center of gravity and the airplane will be rotated as for a dive. A movement of shaft 18 to the rear will cause the aircraft to pitch up at the nose.

A lateral movement of the shaft 18 will tilt the path of rotation of the wings so that the lift force passes to one side of the center of gravity which will cause a roll of the aircraft, the top of the machine rotating toward the low side of the path.

Thus it is clear that a tilting of the shaft 18 universally will control the rolling and pitching of the aircraft.

I prefer to move the lower end of shaft 18 by fluid pressure operating upon pistons connected by a suitable linkage system to the end of shaft 18. (See Figures 4 and 5.) For instance, to provide a forward movement of the end of shaft 18 I employ the cylinder 48 having a piston 49 within. (See Figure 4a.) The piston rod 50 is connected to the bearing ring 51 on the end of shaft 18 by a universal joint 52. The bearing ring is free to turn on shaft 18 to accommodate the universal movement of the shaft. The rear end of the cylinder is attached to the blower 29 by the universal joint 53. The cylinder could, of course, also be attached directly to the structure of the aircraft.

The piston in the cylinder is moved by fluid pressure supplied through the tubes 54 and 55. The fluid passes through a two-way valve 56 under the control of the pilot. (See Figures 4 and 5.) By controlling the valve 56, fluid which enters by tube 57 is sent either to the forward or rearward end of the cylinder 48. By sending fluid through tube 55 the piston 48 is pushed forward while the reverse is the case for a flow to the cylinder through tube 54.

The shaft 18 is moved laterally by a mechanism like that for longitudinal control. It consists of the cylinder 57, rod 58 and appropriate universal joints 59 and 60. The valve 61 and tubes 62 and 63 convey the fluid to and from the cylinder.

Fluid under pressure is supplied by the gear pump 64 driven by gears 65 and 66, of which the latter is fixed on the shaft 30 so that the wings can drive the pump and make the control of the aircraft dependent on them and independent of the functioning of the engine 36. Other types of pumps can be used if desired. The pump is supported on the aircraft structure. The tubes 67 and 68 convey fluid to and from the pump and the valves 56 and 61.

Details of the interior of a valve are shown in Figures 5a and 5b. The valve case is 69 and the valve rotor is 70. The rotor is rotatably borne on the tube 71 which extends the depth of the casing interior and is ported in two places 71a and 71b. The rotor also has two ports 70a and 70b. When fluid is being sent from the inlet tube to the tube 54 going to one end of the cylinder, the rotor part 70c normally does not exclude entirely the access of the incoming fluid to the tube 55 and the ports 70a and 71a. Rather, fluid from both tubes 55 and 57 has access to the ports 70a and 71a. By permitting leakage past 70c a more sensitive control is obtained for the cylinders 48 and 57 and also one that provides a movement of the piston 49 to a position in accordance with the stick position.

Control of the valves is exercised through a conventional control mechanism of which the torque tube 75 and push tube 76 are shown in Figures 4 and 5. A rotation of the torque tube 75 rotates the valve arm 74 by means of the link 78 and arm 79. (See Figure 5 particularly.) The push-pull tube 76 (Figures 4 and 5) operates the bell crank 80, link 81 and valve arm 74a.

The torque tube and control stick with connecting members is shown isolated from the aircraft in Figure 20. The stick is 82 and is pivoted at 83 for fore and aft rocking. The tube 76 is pin connected to the lower end of the stick. If the control is traced it will be found that a forward movement of the top of the stick causes the aircraft to dive while a lateral stick movement causes the aircraft to roll in the same direction. Thus the stick movement and the maneuvers of the aircraft are according to present conventions.

In Figures 14 to 19 I illustrate a more complicated form of the wing arrangement and the means of supplying them with fluid. These give the form I prefer. The external view of the aircraft is the same as previously described and so the Figures 1, 2 and 3 serve to indicate the localities of the various section drawings.

Referring particularly to Figures 14 to 17, it will be observed that the hub socket 84 and shaft 85 are definitely positioned with respect to the aircraft structure. That is, the shaft 85 can rotate about its axis but it is not tiltable as was shaft 18 in Figures 4 and 5. The shaft 85 is rotatably supported on the thrust ball bearing 86 and the radial ball bearings 87. The bearings are in turn supported by the frame F.

The wings, Figures 16 and 17, have both upper and lower surface slots with a partition 88 to divide the wing interior into two compartments each associated with one of the slots. Thus slot 89 is in communication with the forward compartment 90 and the slot 91 is in communication with compartment 92. The partition 88 is vertical for the major portion of the span but is twisted to become horizontal at the root of the wing, as indicated in Figure 16. The element 8 is still vertical and serves to secure the wing to the hub socket 84 which is identical with the socket 7 except for the omission of the arm 33.

On either side of the element 8 are positioned the valves 93 which are hinged at their outer ends to the partition 88 by a pin at 94. A rotation of the valves about their pins deflects the air to a greater extent into one of the wing compartments 90 and 92 so that the flow to the upper and lower surface slots are controlled differentially.

A flow out the upper surface slot will increase the lift of the wing while a flow out the lower surface slot will decrease the lift.

The valves 93 are normally held in a definite position relative to the aircraft by the forked links 32a which have ball and socket joints at each end. A movement of a wing upward will rotate the valve relative to the wing in such a manner as to admit more fluid to compartment 92 and less air to compartment 90 so that the lift of the wing is decreased. That is, the compartment 92 is in communication with the portion of the wing inlet above the valves 93. It is clear from Figure 16 that the partition 88 is twisted to provide such communication.

The valves 93 can be operated by the pilot through the control mechanism. The links 32a extend downward and connect to a hollow spherical segment or control ring 95 which is universally supported on ball bearings by the spherical surface 96 formed inside the casing head 97. The control ring 95 can be rocked by the control rods 98, 99, 100, and 101, shown in Figures 14 and 15. These rods have ball and socket joints 102 at their upper ends which attach to the ring rotatably borne in the control ring 95. That is, the ring 95 rotates with the wings about their common axis while ring 103 does not rotate about that axis.

Control of the rocking of the control ring is accomplished through the bell crank 104 and push-pull tube 76 for longitudinal control. In lateral control the torque tube 75 and arm 79, Figure 15, link 77, auxiliary lever 77a and link 77b tilt the rocker arm 105 to which the control rods 100 and 101 are attached. It will now be clear that a movement of the control stick can cause lateral and longitudinal tilting of the control ring 95.

A tilt of the control ring rotates all the valves simultaneously and varies the lift of the wings so that their mean path is tilted and causes the lift force to pass to one side of the center of gravity of the machine as described earlier.

The conduit 28c conducts the fluid from the blower 29 to the wing inlet. A shield 106 is inserted in the conduit so as to guide fluid past the control ring and associated mechanism which, if it were not covered, would cause undue turbulence in the conduit flow.

The tail propeller 37 is driven by the shaft 39a by wing power transmitted through the gears 40 and 41 and the shaft 85.

The casing head 97 is an integral part of the hub socket 84 and rotates with the wings. The joint between the conduit 28c and the head is sealed by the sealing ring 107, Figures 14 and 15.

There are three forked arms 97a which are hinged to the casing head 97. See Figures 14 and 14a. The prongs of the forked lower end fit slideably over the elements 8a, 8b, and 8c, respectively. The slot between the prongs permits the upward oscillation of the wings while the hinge at the upper end permits the wings to oscillate in a horizontal plane. At the same time the wings are restrained from any extreme rolling about a spanwise axis which would change the angles of attack of the wings unduly. The change in the angles is such as to reduce the vertical oscillation since when driven the advancing wing will lag more than the retreating wing.

Air for the blower 29 is taken into the fuselage 1 through the annular opening 1a in the side of the aircraft.

With articulated wings it is important that the propelling jet or jets be properly directed. For instance, if a jet is directed with an upward component of velocity when being discharged from the retreating wing, there is a reactive force arising from the jet and this force tends to depress the retreating wing. Care should therefore be taken to control any propelling flow from the wings in accordance with the angular position of the wing relative to the aircraft.

While I have illustrated a preferred form of the invention it is to be understood that I do not limit myself to these exact forms and constructions but intend to claim it broadly. It will be clear to those skilled in the art that changes and modifications can be made in it without departing from the spirit or scope as defined in the appended claims.

I claim:

1. In an aircraft in combination, a body, a direct lift system to sustain the body comprising a plurality of hollow wings rotatable about an upright axis and oscillatable relative thereto, a plurality of said wings having an opening in the wing surface directed rearward and in communication with the wing interior, means of blowing in communication with the wing interiors to induce a rearward blast of fluid through said openings, and substantially independent valvular means for each wing having a said opening to regulate the flow from each wing's respective opening, said valvular means being governed by the oscillation of same said wing receiving the flow through said valvular means, each valvular means being operable substantially independently of the other valvular means.

2. In an aircraft, a direct lift system to support the aircraft including at least two hollow wings rotatable about an upright axis and oscillatable relative thereto, each of said wings having a spanwise slot in its lower surface in communication with the wing interior and directed rearward with respect to the wing's direction of rotation, a blower means in communication with the wing interiors to induce a rearward flow out said slots to rotate the wings by the momentum reaction of the discharged fluid, and automatic valvular means for each wing to control the slot flow in accordance with the angular position of said wing relative to the aircraft to provide chiefly favorable vertical momentum reaction forces on the oscillatable wing, said valvular means including a streamline vane pivoted for oscillation by its respective wing.

3. In an aircraft, in combination, a body, a direct lift system including a plurality of wings rotatable about an upright axis, ball and socket supporting means to mount said wings on the body for oscillations relative thereto about a point as a common center for at least three of the wings and providing for the oscillations of each of the said three wings about said center and about axes transverse to its wing span substantially independently of each other with respect to both vertical and horizontal oscillations and means to restrain the wings against changes in the pitch angle beyond a predetermined range of angles.

4. In an aircraft in combination a plurality of wings having hollow interiors and rotatable about an upright axis and oscillatable relative thereto, each wing having a spanwise slot in its surface in communication with its hollow interior, means of blowing in communication with said hollow interiors to induce outward flows through said slots to alter the lifts of the wings, an oscillatable valve for each wing to control the flow through its slot to alter the lift of the wings unsymmetrically to achieve a balance of the aircraft against upsetting moments, a mechanism interconnecting the wing and its respective valve to oscillate it to control the flow to the wing slot, said mechanism being adapted so that for a given angle of oscillation of a wing the valve associated with said wing is moved through a larger angle by the oscillation of the same said wing.

5. In an aircraft in combination a direct lift system including a plurality of wings rotatable about an axis and oscillatable relative thereto, each said wing having a hollow interior and a slot in the surface leading into its hollow interior, each slot extending spanwise for use in altering the lift of the wing, a means of blowing in communication with said hollow interiors to induce a flow through said slots to alter the lift of the wings, valve means including a movable valve element for each wing to control the flow through its respective slot, each said valve means being operable substantially independently of the valve means of the wings on the opposite side of said axis, and means interconnecting said valve means and its respective wing so that the degree of oscillation of the wing determines the degree of movement of said valve element associated with the same said wing.

6. In an aircraft in combination, a plurality of wings rotatable about an upright axis and oscillatable relative thereto to sustain the aircraft, each of said wings having a hollow interior and a slot in the upper surface of the wing in communication with said interior, a valve for each wing to control the flow through its slot, and a mechanism having an element movable by the oscillation of the wing to operate the valve to supply a flow of fluid to the slot of the associated wing when said wing is descending in its oscillation, the flow through said slot of the descending wing serving to increase the lift of said wing and reduce its downward travel.

EDWARD A. STALKER.